US010625366B2

(12) United States Patent
Ryu et al.

(10) Patent No.: US 10,625,366 B2
(45) Date of Patent: Apr. 21, 2020

(54) WELDING GUN AND UNIDIRECTIONAL WELDING SYSTEM PROVIDED WITH THE SAME

(71) Applicants: Hyundai Motor Company, Seoul (KR); Kia Motors Corporation, Seoul (KR)

(72) Inventors: Hyun Jung Ryu, Seoul (KR); Jimo Kim, Busan (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 368 days.

(21) Appl. No.: 15/612,994

(22) Filed: Jun. 2, 2017

(65) Prior Publication Data

US 2018/0154476 A1    Jun. 7, 2018

(30) Foreign Application Priority Data

Dec. 6, 2016   (KR) ........................ 10-2016-0165279

(51) Int. Cl.
| | | |
|---|---|---|
| *B23K 11/11* | (2006.01) | |
| *B23K 11/36* | (2006.01) | |
| *B23K 11/28* | (2006.01) | |
| *B23K 37/04* | (2006.01) | |
| *B23K 101/00* | (2006.01) | |

(52) U.S. Cl.
CPC .............. *B23K 11/11* (2013.01); *B23K 11/28* (2013.01); *B23K 11/362* (2013.01); *B23K 37/0443* (2013.01); *B23K 2101/006* (2018.08)

(58) Field of Classification Search
CPC ... B23K 11/11; B23K 11/3063; B23K 11/314; B23K 2101/006
USPC .......... 219/86.25, 125.1, 136, 137.2, 137.31, 219/137.51, 137.7, 137.42–137.44, 219/137.52, 137.61–137.63; 901/42, 41, 901/48, 19, 47; 358/100, 101, 107, 901
See application file for complete search history.

(56) References Cited

U.S. PATENT DOCUMENTS 2,833,913 A  *  5/1958  Bernard ................. B23K 9/291
                                            219/137.43
2,866,887 A  *  12/1958 Kumagai ............. B23K 9/0956
                                            219/124.21
(Continued)

FOREIGN PATENT DOCUMENTS

JP          5717274 B2    5/2015
KR    2007-0111875 A    11/2007
(Continued)

*Primary Examiner* — Dana Ross
*Assistant Examiner* — Ket D Dang
(74) *Attorney, Agent, or Firm* — Mintz Levin Cohn Ferris Glovsky and Popeo, P.C.; Peter F. Corless

(57) ABSTRACT

A welding gun is incorporated into a unidirectional welding system, where the unidirectional welding system includes: the welding gun performing welding when a set pressing force is applied; a power portion configured to generate power to be applied to the welding gun; a power connecting portion having one end portion connected to the power portion through a power wire and an opposite end portion engaged with the welding gun; and a power switch provided at the power connecting portion to selectively apply the power generated from the power portion to the welding gun.

8 Claims, 3 Drawing Sheets

(56) References Cited

U.S. PATENT DOCUMENTS

| | | | | | |
|---|---|---|---|---|---|
| 3,046,438 | A | * | 7/1962 | Elseth | B23K 9/1336 |
| | | | | | 314/69 |
| 3,334,211 | A | * | 8/1967 | Wheeler | B21D 39/03 |
| | | | | | 219/78.16 |
| 3,501,613 | A | * | 3/1970 | Cornell, Jr. | B23K 9/28 |
| | | | | | 219/137.9 |
| 3,543,989 | A | * | 12/1970 | Cooper | B23K 9/287 |
| | | | | | 228/25 |
| 3,741,409 | A | * | 6/1973 | Painter | B65G 61/00 |
| | | | | | 414/733 |
| 4,160,151 | A | * | 7/1979 | Tonita | B23K 9/1333 |
| | | | | | 219/137.7 |
| 4,297,561 | A | * | 10/1981 | Townsend | B23K 9/295 |
| | | | | | 219/137.42 |
| 4,309,588 | A | * | 1/1982 | Hill | B23K 9/291 |
| | | | | | 219/136 |
| 4,364,535 | A | * | 12/1982 | Itoh | B23K 26/08 |
| | | | | | 248/123.2 |
| 4,540,870 | A | * | 9/1985 | Kaufmann | B23K 9/287 |
| | | | | | 219/126 |
| 4,896,015 | A | * | 1/1990 | Taboada | A61B 18/201 |
| | | | | | 219/121.78 |
| 5,232,192 | A | * | 8/1993 | Akutagawa | B23K 37/0211 |
| | | | | | 248/283.1 |
| 6,087,611 | A | * | 7/2000 | De Bruyn | B23K 11/28 |
| | | | | | 219/86.25 |
| 6,337,458 | B1 | * | 1/2002 | Lepeltier | B23K 11/253 |
| | | | | | 219/108 |
| 8,231,045 | B2 | * | 7/2012 | Lagerkvist | B23K 37/0229 |
| | | | | | 219/124.1 |
| 2006/0049159 | A1 | * | 3/2006 | Nihei | B23K 9/1336 |
| | | | | | 219/137.9 |
| 2010/0012637 | A1 | * | 1/2010 | Jaeger | B23K 9/295 |
| | | | | | 219/130.1 |
| 2011/0062130 | A1 | * | 3/2011 | Barker | B23K 9/295 |
| | | | | | 219/130.1 |
| 2014/0332504 | A1 | * | 11/2014 | Hamada | B23K 31/00 |
| | | | | | 219/121.4 |
| 2015/0360313 | A1 | * | 12/2015 | Andersen | B23K 37/0282 |
| | | | | | 219/130.1 |
| 2016/0167724 | A1 | * | 6/2016 | Kilibarda | B23P 21/004 |
| | | | | | 29/401.1 |

FOREIGN PATENT DOCUMENTS

KR         10-1189064 B1    10/2012
KR         20150059543 A *    6/2015

* cited by examiner

WELDING GUN AND UNIDIRECTIONAL WELDING SYSTEM PROVIDED WITH THE SAME

CROSS-REFERENCE TO RELATED APPLICATION

This application claims under 35 U.S.C. § 119(a) the benefit of Korean Patent Application No. 10-2016-0165279 filed in the Korean Intellectual Property Office on Dec. 6, 2016, the entire contents of which are incorporated herein by reference.

BACKGROUND

(a) Technical Field

The present disclosure relates to a welding gun and a unidirectional welding system provided with the same that includes a welding tip for welding one side of a welding object.

(b) Description of the Related Art

Generally, as a method of welding two panels during an assembly process of a vehicle body, spot resistance welding is used, and the spot resistance welding utilizes a method of welding vehicle body panels through a spot welding gun while applying a pressing force to surfaces of the vehicle body panels.

A conventional unidirectional spot welding gun moves together with forward and backward motion of two panels to be welded, and performs welding in a state in which the panels and the welding gun are in contact with an electrical connection.

However, after the conventional unidirectional spot welding gun moves to the two panels, while moving forward in a state of contacting the two panels, it electrically connects with the two panels to perform welding.

Meanwhile, when a worker uses the welding gun to perform unidirectional welding, when a predetermined pressing force is not applied, it is difficult to obtain uniform welding quality, and the welding quality may vary depending on the worker.

The above information disclosed in this Background section is only for enhancement of understanding of the background of the disclosure and therefore it may contain information that does not form the prior art that is already known in this country to a person of ordinary skill in the art.

SUMMARY

The present disclosure provides a welding gun incorporated into a unidirectional welding system that may realize uniform welding quality regardless of worker skill and may improve welding quality by applying a predetermined pressing force.

An exemplary embodiment of the present disclosure provides a unidirectional welding system including: a welding gun performing welding when a set pressing force is applied; a power portion configured to generate power to be applied to the welding gun; a power connecting portion having one end portion connected to the power portion through a power wire and an opposite end portion engaged with the welding gun; and a power switch provided at the power connecting portion to selectively apply the power generated from the power portion to the welding gun.

The welding gun may further include a casing mounted between a gun body and a pressure head, and in which a head elastic member is disposed.

The welding gun may include: a welding tip configured to be installed at one end portion of the gun body; and a detection portion configured to be provided between the gun body and the casing in order to detect movement of the pressure head when the pressure head presses the head elastic member to be compressed.

The unidirectional welding system may further include: a rod having one end connected to the gun body and an opposite end fixed to the welding tip; a housing having an inner circumferential surface corresponding to an outer circumferential surface of the rod, one end portion engaged with the gun body, and an opposite end portion including an inner circumferential surface provided with a catching portion of which an inner diameter decreases; a surface contact supporting portion having a pipe shape and configured to be inserted between the housing and the rod and to include an expansion portion of which outer diameter increases to be caught by the catching portion at an inserted outer circumferential surface thereof; and a supporting portion elastic member configured to elastically support the surface contact supporting portion.

A welding gun may be loaded on a lower frame.

A transfer wheel may be installed at a lower portion of the lower frame so that the lower frame is transferred.

The power portion may be installed at an upper portion of the lower frame, and the power portion may apply power to the welding tip through the power wire.

A tip dresser configured to eliminate foreign material from the welding tip may be installed at the lower frame.

The unidirectional welding system may further include: a vertical beam having a lower end portion fixed to the lower frame and to be installed in a direction perpendicular to the lower frame; a horizontal beam configured to extend in a horizontal direction from an upper end portion of the vertical beam; a rail formed along the horizontal beam; a moving beam configured to be movably installed along the rail; and a spring balance configured to be installed at the moving beam and to pull a wire using spring tension.

The spring balance may include a first spring balance and a second spring balance, the first spring balance may be installed to upwardly pull the welding gun including the gun body, the welding tip, the pressure head, and the detection portion through the wire, and the second spring balance may be installed to upwardly pull the power wire applying power to the welding gun.

The unidirectional welding system may further include a supporting beam having one end portion connected with the vertical beam and an opposite end portion connected with the horizontal beam and configured to support the horizontal beam based on the vertical beam.

An exemplary embodiment of the present disclosure provides a welding gun including: a welding tip configured to be installed at one end portion of a gun body; a pressure head configured to be installed at an opposite end portion of the gun body; a head elastic member configured to elastically support the pressure head; a detection portion configured to detect movement of the pressure head when the pressure head presses the head elastic member to be compressed; and a power switch configured to be provided at the gun body to selectively apply the power to the welding tip.

The welding gun further may further include a power connecting portion configured to be installed with the power switch and to include one end portion supplied to the power from an outside and an opposite end portion engaged with the gun body.

The welding gun further may further include a casing configured to be provided between the gun body and the pressure head and in which the head elastic member is disposed.

The detection portion may be disposed between the gun body and the casing.

The welding gun further may further include: a rod having one end connected to the gun body and an opposite end fixed to the welding tip; a housing having an inner circumferential surface corresponding to an outer circumferential surface of the rod, one end portion engaged with the gun body, and an opposite end portion including an inner circumferential surface provided with a catching portion of which an inner diameter decreases; a surface contact supporting portion having a pipe shape and configured to be inserted between the housing and the rod and to include an expansion portion of which an outer diameter increases to be caught by the catching portion at an inserted outer circumferential surface thereof; and a supporting portion elastic member configured to elastically support the surface contact supporting portion.

As described above, according to the welding gun and the unidirectional welding system provided with the same of the exemplary embodiment of the present disclosure, when a predetermined force or more applied to a pressure head is detected by a detection portion, electrical power is applied to a welding tip, and then while the welding tip presses a welding object with a predetermined force, welding is performed, thereby uniformly maintaining welding quality.

In addition, it is possible to improve welding performance by constantly maintaining a pressing force of the welding gun.

Further, it is possible to easily perform maintenance by disposing the tip dresser together with the welding gun, and it is possible to improve work convenience by applying a spring balance.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, an exemplary embodiment of the present disclosure will be described in detail with reference to the accompanying drawings.

Figure 1:
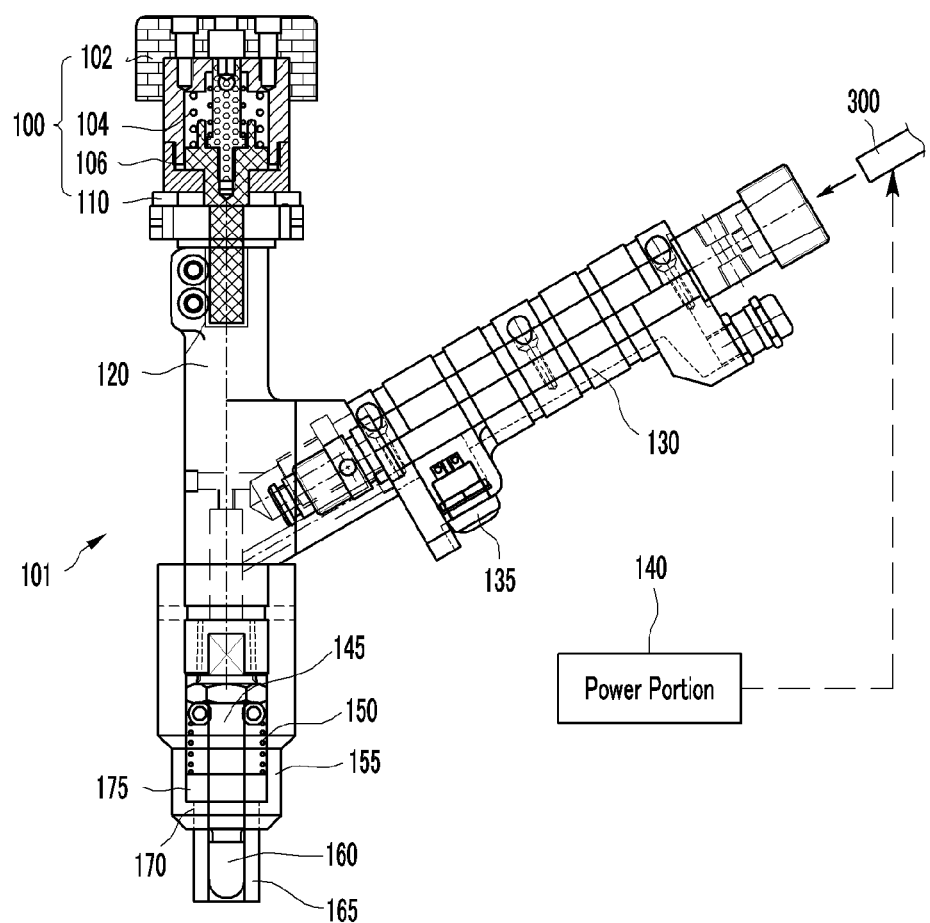
FIG. 1 illustrates a partial cross-sectional view of a welding gun according to an exemplary embodiment of the present disclosure.

FIG. 1 illustrates a partial cross-sectional view of a welding gun according to an exemplary embodiment of the present disclosure.

Referring to FIG. 1, a welding gun 101 includes a pressure switch 100, a gun body 120, a power connecting portion 130, a power switch 135, a power portion 140, a rod 145, a supporting portion elastic member 150, a housing 155, a welding tip 160, a surface contact supporting portion 165, a catching portion 170, an expansion portion 175, and a power wire 300.

As provided herein, the pressure switch 100 includes a pressure head 102, a head elastic member 104, a casing 106, and a detection portion 110.

The head elastic member 104 that is compressed by a predetermined force is installed inside the casing 106.

The pressure head 102 is mounted on an upper end portion of the casing 106 so that the head elastic member 104 may be selectively compressed.

The casing 106 is engaged with an upper end portion of the gun body 120. The detection portion 110 is positioned between a lower surface of the casing 106 and an upper surface of the gun body 120.

Accordingly, when the pressure head 102 is pressed by a predetermined force or more, the head elastic member 104 is compressed by the pressure head 102, and simultaneously, the casing 106 descends. The descended casing 106 presses the detection portion 110.

When the detection portion 110 is pressed by the casing 106, the detection portion 110 transmits a detection signal to the power portion 140.

A front end portion of the power connecting portion 130 is engaged with a central portion of the gun body 120, and the power switch 135 is disposed at one side of the power connecting portion 130. The power connecting portion 130 may receive power from the power wire 300.

When a worker operates the power switch 135, the power switch 135 transmits the detection signal to the power portion 140.

When the power portion 140 receives the signal through the detection portion 110 and the power switch 135, it supplies the power to the power connecting portion 130 through the power wire 300.

The power connecting portion 130 supplies the power to the welding tip 160 through a power supplying line (not shown).

An upper end of the rod 145 is connected to a lower end portion of the gun body 120, and the welding tip 160 is fixed to a lower end portion of the rod 145.

The housing 155 is mounted on the lower end portion of the gun body 120. A predetermined gap is formed between an inner circumferential surface of the housing 155 and the outer circumferential surface of the rod 145. In addition, the catching portion 170, an inner diameter of which decreases, is formed at a lower inner circumferential surface of the housing 155.

In the present exemplary embodiment, the surface contact supporting portion 165 is formed with a pipe shape to be inserted between an inner circumferential surface of the housing 155 and the outer circumferential surface of the rod 145. At an upper outer circumferential surface of the surface contact supporting portion 165 inserted between the housing 155 and the rod 145, the expansion portion 175, an outer diameter of which increases, is formed to be caught in the catching portion 170.

The supporting portion elastic member 150 is disposed between the rod 145 and the housing 155, and elastically supports the surface contact supporting portion 165 to be directed downward.

In the exemplary embodiment of the present disclosure, a worker holds the power connecting portion 130 and the gun body 120, and brings the surface contact supporting portion 165 into close contact with a welding object. Then, when the worker presses the pressure head 102 toward the welding object, as the surface contact supporting portion 165 rises with respect to the welding tip 160, the welding tip 160 closely contacts the welding object.

Then, the worker presses the pressure head 102 with a predetermined force or more, and the detection portion 110 detects movement of the casing 106. In this state, when the power switch 135 is pressed, the power portion 140 applies power to the welding tip 160 through the power wire 300, thereby welding the welding object.

That is, according to the exemplary embodiment of the present disclosure, in the state in which the pressure head 102 is pressed by the predetermined force, when the power switch 135 is operated, the detection portion 110 detects this to apply the power to the welding tip 160.

Accordingly, by performing welding in the state in which the welding tip 160 presses the welding object with a predetermined force, it is possible to uniformly maintain welding quality.

Figure 2:
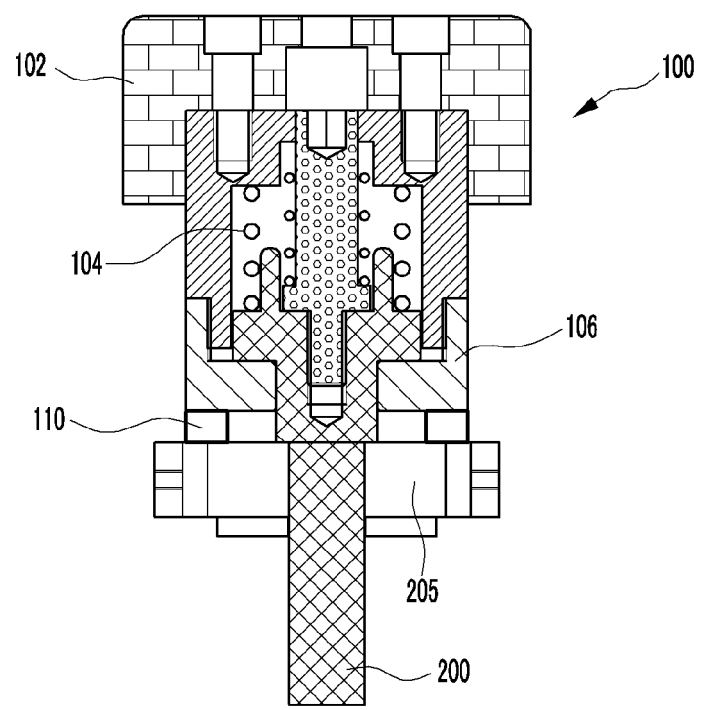
FIG. 2 illustrates a partially detailed cross-sectional view of a welding gun according to an exemplary embodiment of the present disclosure.

FIG. 2 illustrates a partially detailed cross-sectional view of a welding gun according to an exemplary embodiment of the present disclosure.

Referring to FIG. 2, the pressure switch 100 includes a mounting shaft 200. A lower end portion of the mounting shaft 200 is inserted from an upper portion of the gun body 120 to a center thereof.

An upper end portion of the mounting shaft 200 is inserted into a lower center of the casing 106. The head elastic member 104 is interposed between the upper end portion of the mounting shaft 200 and an inner upper surface of the casing 106. The pressure head 102 is engaged with an upper end portion of the casing 106.

The lower end portion of the mounting shaft 200 passes through a center of a supporting member 205. The supporting member 205 is fixed to the upper end portion of the gun body 120. The detection portion 110 is interposed between an upper surface of the supporting member 205 and a lower surface of the casing 106.

In FIG. 2, it is depicted that the detection portion 110 is interposed between the casing 106 and the supporting member 205, but the present disclosure is not limited thereto, and the detection portion 110 may be interposed between the casing 106 and the gun body 120.

Figure 3:
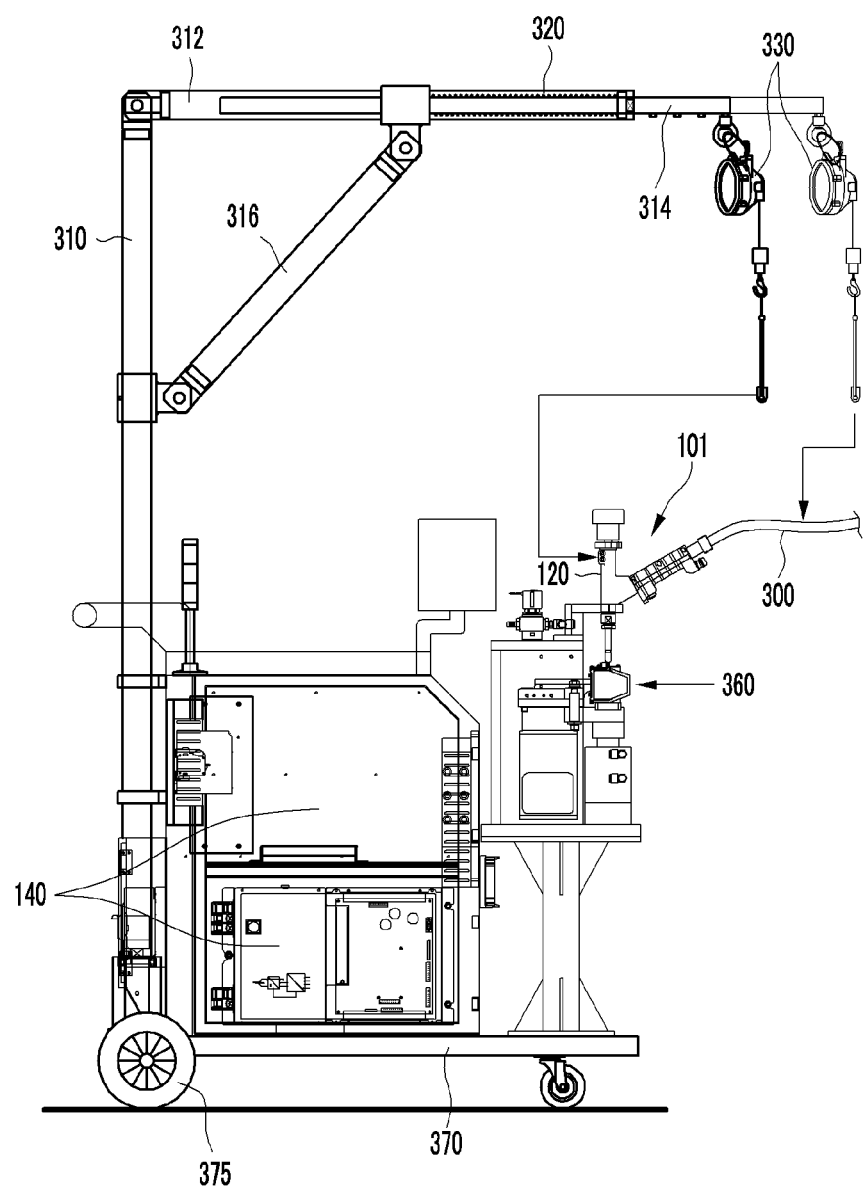
FIG. 3 illustrates an overall side view of a unidirectional welding system according to an exemplary embodiment of the present disclosure.

FIG. 3 illustrates an overall side view of a unidirectional welding system according to an exemplary embodiment of the present disclosure.

Referring to FIG. 3, the unidirectional welding system includes a lower frame 370, a transfer wheel 375, a vertical beam 310, a horizontal beam 312, a rail 320, a moving beam 314, a spring balance 330, and a tip dresser 360.

The lower frame 370 is disposed to be movable on the ground by the transfer wheel 375. A transformer (TR) and a transmission control (TC), as the power portion 140, are mounted on an upper portion of the lower frame 370. An amount of a maximum current of the power portion 140 is about 13,000 Å, and it is possible to shorten a work pause time to 5 s or less by increasing an amount of a current.

The welding gun 101 is loaded on the lower frame 370. The tip dresser 360 is mounted on the lower frame 370 to clean the welding tip 160 provided at the welding gun 101 corresponding to the welding gun 101.

A lower end portion of the vertical beam 310 is fixed to the lower frame 370, and is installed in a direction perpendicular to the lower frame 370. The horizontal beam 312 extends in a horizontal direction from an upper end of the vertical beam 310.

Herein, a supporting beam 316 is mounted between the vertical beam 310 and the horizontal beam 312.

One end of the supporting beam 316 is connected with the vertical beam 310, and the other end (i.e., an opposite end) of the supporting beam 316 is connected with the horizontal beam 312, thus the supporting beam 316 upwardly supports the horizontal beam 312 based on the vertical beam 310.

In the present exemplary embodiment, the moving beam 314 is disposed to be reciprocally movable along a length direction of the rail 320 installed at the horizontal beam 312.

The spring balance 330 is disposed at the moving beam 314.

The spring balance 330 includes first and second spring balances.

The first spring balance is disposed to pull the welding gun 101 upwardly through a wire. The second spring balance supplies a predetermined force for pulling up the power wire 300 connected to the power connecting portion 130.

Thus, the first and second spring balances, when the welding gun 101 and the power wire 300 move, may reduce a burden of the worker.

Therefore, according to the welding gun and the unidirectional welding system provided with the same of the exemplary embodiment of the present disclosure, it is possible to improve unidirectional welding performance and welding quality by maintaining the pressing force on the welding gun 101 to be constant.

In addition, it is possible to easily perform maintenance by installing the tip dresser 360 together with the welding gun 101, and it is possible to improve work convenience by applying the spring balance.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. A unidirectional welding system, comprising:
   a welding gun performing welding when a set pressing force is applied, wherein the welding gun is loaded on a lower frame;
   a power portion configured to generate a power to be applied to the welding gun;
   a power connecting portion having one end portion connected to the power portion through a power wire and an opposite end portion engaged with the welding gun;
   a power switch provided at the power connecting portion to selectively apply the power generated from the power portion to the welding gun;
   a vertical beam having a lower end portion fixed to the lower frame and configured to be installed in a direction perpendicular to the lower frame;
   a horizontal beam configured to extend in a horizontal direction from an upper end portion of the vertical beam;
   a rail formed along the horizontal beam;
   a moving beam configured to be movably installed along the rail; and
   a spring balance configured to be installed at the moving beam and to pull a wire using spring tension,
   wherein the spring balance includes a first spring balance and a second spring balance,
   wherein the first spring balance is installed to upwardly pull the welding gun through the wire, and
   wherein the second spring balance is installed to upwardly pull the power wire applying the power to the welding gun.

2. The unidirectional welding system of claim 1, wherein the welding gun further includes a casing mounted between a gun body and a pressure head, and in which a head elastic member is disposed.

3. The unidirectional welding system of claim 2, wherein the welding gun includes:
   a welding tip configured to be installed at one end portion of the gun body; and
   a detection portion configured to be provided between the gun body and the casing in order to detect movement of the pressure head when the pressure head presses the head elastic member to be compressed.

4. The unidirectional welding system of claim 3, further comprising:
   a rod having one end connected to the gun body and an opposite end fixed to the welding tip;
   a housing having an inner circumferential surface corresponding to an outer circumferential surface of the rod, one end portion engaged with the gun body, and an opposite end portion including an inner circumferential surface provided with a catching portion of which an inner diameter decreases;
   a surface contact supporting portion having a pipe shape and configured to be inserted between the housing and the rod and to include an expansion portion of which an outer diameter increases to be caught by the catching portion at an inserted outer circumferential surface thereof; and
   a supporting portion elastic member configured to elastically support the surface contact supporting portion.

5. The unidirectional welding system of claim 1, wherein a transfer wheel is installed at a lower portion of the lower frame so that the lower frame is transferred.

6. The unidirectional welding system of claim 1, wherein the power portion is installed at an upper portion of the lower frame, and the power portion applies the power to the welding tip through the power wire.

7. The unidirectional welding system of claim 1, wherein a tip dresser configured to eliminate foreign material from the welding tip is installed at the lower frame.

8. The unidirectional welding system of claim 1, further comprising:
   a supporting beam having one end portion connected with the vertical beam and an opposite end portion connected with the horizontal beam and configured to support the horizontal beam based on the vertical beam.

* * * * *